United States Patent
Sun et al.

(10) Patent No.: US 11,924,070 B2
(45) Date of Patent: Mar. 5, 2024

(54) DATA PROCESSING METHOD AND DEVICE

(71) Applicants: CHINA MOBILE COMMUNICATION CO., LTD RESEARCH INSTITUTE, Beijing (CN); CHINA MOBILE COMMUNICATIONS GROUP CO., LTD., Beijing (CN)

(72) Inventors: Qi Sun, Beijing (CN); Ran Duan, Beijing (CN); Shuangfeng Han, Beijing (CN)

(73) Assignees: CHINA MOBILE COMMUNICATION CO., LTD RESEARCH INSTITUTE, Beijing (CN); CHINA MOBILE COMMUNICATIONS GROUP CO., LTD., Beijing (CN)

( * ) Notice: Subject to any disclaimer, the term of this patent is extended or adjusted under 35 U.S.C. 154(b) by 0 days.

(21) Appl. No.: 17/421,096

(22) PCT Filed: Jan. 7, 2020

(86) PCT No.: PCT/CN2020/070656
§ 371 (c)(1),
(2) Date: Jul. 7, 2021

(87) PCT Pub. No.: WO2020/143614
PCT Pub. Date: Jul. 16, 2020

(65) Prior Publication Data
US 2022/0103440 A1 Mar. 31, 2022

(30) Foreign Application Priority Data
Jan. 7, 2019 (CN) .......................... 201910010612.1

(51) Int. Cl.
*H04L 43/022* (2022.01)
*H04L 43/06* (2022.01)
(Continued)

(52) U.S. Cl.
CPC ............ *H04L 43/022* (2013.01); *H04L 43/06* (2013.01); *H04L 69/26* (2013.01); *H04W 4/12* (2013.01)

(58) Field of Classification Search
CPC ....... H04L 43/022; H04L 43/06; H04L 69/26; H04W 4/12
(Continued)

(56) References Cited

U.S. PATENT DOCUMENTS

2015/0139166 A1* 5/2015 Yao ....................... H04W 40/02
370/329
2017/0180778 A1* 6/2017 Lee ..................... H04N 21/4126
(Continued)

FOREIGN PATENT DOCUMENTS

CN 101369916 A 2/2009
CN 101635653 A 1/2010
(Continued)

OTHER PUBLICATIONS

International Search Report in the international application No. PCT/CN2020/070656, dated Apr. 3, 2020, 2 pgs.
(Continued)

*Primary Examiner* — James E Springer
(74) *Attorney, Agent, or Firm* — Cooper Legal Group, LLC

(57) ABSTRACT

Provided in embodiments of the present disclosure are a data processing method and device, the method comprising: receiving a first request message from a target node, the first information containing at least one from among the following: information related to creating a data collection task,
(Continued)

information related to updating a data collection task, and information related to cancelling a data collection task; and sending to the target node a first response message used to respond to the first request message.

12 Claims, 9 Drawing Sheets

(51) Int. Cl.
*H04L 69/00* (2022.01)
*H04W 4/12* (2009.01)
(58) Field of Classification Search
USPC ........................................................ 709/224
See application file for complete search history.

(56) References Cited

U.S. PATENT DOCUMENTS

| | | | | |
|---|---|---|---|---|
| 2017/0317773 | A1* | 11/2017 | Yamagishi | .............. H04H 20/91 |
| 2018/0227390 | A1* | 8/2018 | Reznik | .................. H04L 67/568 |

FOREIGN PATENT DOCUMENTS

| | | | |
|---|---|---|---|
| CN | 102036289 | A | 4/2011 |
| CN | 102594826 | A | 7/2012 |
| CN | 103024767 | A | 4/2013 |
| CN | 103096361 | A | 5/2013 |
| CN | 103402215 | A | 11/2013 |
| CN | 104462235 | A | 3/2015 |
| CN | 104660682 | A | 5/2015 |
| CN | 102761863 | B | 8/2015 |
| CN | 103260190 | B | 3/2016 |
| CN | 105843890 | A | 8/2016 |
| CN | 106101768 | A | 11/2016 |
| CN | 106546960 | A | 3/2017 |
| CN | 109101330 | A | 12/2018 |
| JP | 2018513652 | A | 5/2018 |
| WO | WO-2009056043 | A1 * | 5/2009 ....... G06F 17/30884 |

OTHER PUBLICATIONS

English translation of the Written Opinion of the International Search Authority in the international application No. PCT/CN2020/070656, dated Apr. 3, 2020, 4 pgs.

3rd Generation Partnership Project; "Technical Specification Group Radio Access Network"; Mar. 2019, NG-RAN; Architecture description (Release 15), 3GPP TS 38.401 V15.5.0, 39 pgs.

Supplementary European Search Report in the European application No. 20738830.7, dated Jul. 15, 2022, 9 pgs.

"Target Cell Selection in gNB-CU for EN-DC and Cell Load Reporting from gNB-DU", Feb. 2018, Source: NEC, 3GPP TSG-RAN3#99, R3-180872, Athens, Greece, 11 pgs.

"Introduction of new IEs in X2 for High Performing Load Balancing", Oct. 2017, Source: CMCC, Huawei, ZTE, CATT, 3GPP TSG-RAN WG3 #97bis, R3-173892, Prague, Czech Republic, 4 pgs.

First Office Action of the Japanese application No. 2021-539507, dated Oct. 25, 2022, 10 pgs.

* cited by examiner

DATA PROCESSING METHOD AND DEVICE

CROSS-REFERENCE TO RELATED APPLICATION

This application claims priority to Chinese patent application No. 201910010612.1 filed on Jan. 7, 2019, the content of which is hereby incorporated by reference in its entirety.

TECHNICAL FIELD

Embodiments of the disclosure relate to the technical field of communications, and particularly to a data processing method and a device.

BACKGROUND

With the coming of the Fifth-Generation (5G) era, various communication and processing technologies such as the mobile Internet, the Internet of things, and cloud computing have been developed rapidly, requirements on intelligentization and self-optimization capabilities of radio access networks have increased, and big-data-based wireless network optimization has become a new trend. Data acquisition is the base of big-data-based wireless network optimization. Acquired wireless data may be used to support real-time and non-real-time network optimization and analysis.

At present, data acquisition of a 5G radio access network is mainly implemented by acquiring wireless data from a Distributed Unit (DU) and a Centralized Unit (CU), signaling data and non-signaling data being included. At present, mainstream data acquisition solutions mainly include a software-based acquisition solution and an F1-interface-based data acquisition solution. According to the software-based acquisition solution, signaling on the DU and the CU is acquired to a specified data platform. According to the F1-interface-based data acquisition solution, data of the DU is reported to the CU mainly through an interface between the DU and the CU in the related art.

The present software-based acquisition solution mainly has the following defects.

(1) Acquisition of signaling data is mainly supported, and acquisition of non-signaling data cannot be supported well.

This is mainly because a software-based acquisition protocol is based on a bit sequence design, signaling has a fixed bit length, and thus may be adapted to the software-based acquisition protocol well, while there is too much non-signaling data that is thus difficult to completely encapsulate with data of a bit sequence type.

(2) The flexibility in data clipping is poor.

Since the software-based acquisition protocol is based on the bit sequence design, data acquisition cannot be implemented effectively, and data that is not transmitted still occupies some bits. However, a non-signaling data transmission scenario usually has a great need for clipping.

(3) The reporting flexibility is low.

The software-based acquisition protocol cannot configure reporting of an acquisition device flexibly to be adapted to different real-time and non-real-time data reporting needs and further support periodic, event-triggered, and busy/idle-time reporting mechanisms, etc.

(4) Data distribution under different reporting configurations of multiple target nodes is not supported.

The present software-based acquisition protocol has a fixed reporting target, and cannot implement data distribution under different reporting configurations of multiple targets.

The present F1-interface-based data acquisition solution is mainly applied to data acquisition from the DU to the CU as a part of the radio access network, and mainly has the following defects.

(1) Data acquisition from the DU to the CU is mainly supported, and acquisition of data of the CU is not supported.

(2) An F1 interface resource is occupied, and excessive data acquisition may affect the network.

(3) A real-time data reporting scenario is mainly supported, and non-real-time data reporting is not supported.

(4) The flexibility in data reporting is low. Present F1-interface-based data acquisition is mainly used to acquire data required by a CU function, and thus only supports acquisition of part of data of the DU and is lack of a complete data reporting configuration support.

Based on the above reasons, there is an urgent need at present for a data processing method which may simultaneously support acquisition of various types of signaling and non-signaling data and through which data to be acquired is configured flexibly and a data content to be acquired, an acquisition manner, and a reporting manner are specified.

SUMMARY

The embodiments of the disclosure provide a data processing method and device, to solve the problem of low flexibility of a data processing method in the related art.

According to a first aspect of the embodiments of the disclosure, a data processing method is provided, which may be applied to a source node and include that: a first request message is received from a target node, the first request message including at least one of information about creation of a data acquisition task, information about updating of the data acquisition task, or information about cancellation of the data acquisition task; and a first response message configured to respond to the first request message is sent to the target node.

Optionally, the first request message may include the information about creation of the data acquisition task; the method may further include that: data acquisition is performed according to the information about creation of the data acquisition task, and an acquisition result is sent to the target node.

Optionally, the operation that data acquisition is performed according to the information about creation of the data acquisition task and the acquisition result is sent to the target node may include that: a reporting triggering event Identity (ID) is added to an event monitor; when the event monitor monitors a triggering event corresponding to the reporting triggering event ID, a task ID of the data acquisition task corresponding to the reporting triggering event ID is queried; data acquisition is performed on a data object corresponding to descriptive information of the acquired target data object according to descriptive information of an acquisition configuration to obtain the acquisition result; a first timer is set according to a reporting period, and a second timer is set according to reporting valid time; when the first timer is triggered, the acquisition result is sent to the target node according to a reporting purpose ID; and when the second timer is triggered, the first timer and the second timer are cleared, and then the step that the task ID of the data acquisition task corresponding to the reporting triggering event ID is queried when the event monitor monitors the triggering event corresponding to the reporting triggering event ID is re-executed.

Optionally, the acquisition result may include one or more of the task ID of the data acquisition task, an ID of the source node, and an acquired data object array.

Optionally, the acquired data object array may include one or more of a data object source tag corresponding to a source tag of the acquired target data object, data object context data corresponding to a context acquisition condition of the acquired target data object, and a data object array corresponding to a tag of the acquired target data object, the data object array including one or more of an ID of the data object, a data value of the data object, and data generation time of the data object.

Optionally, the information about creation of the data acquisition task may include one or more of the descriptive information of the acquired target data object, descriptive information of a reporting configuration, and the descriptive information of the acquisition configuration; the first response message may include one or more of the task ID of the created data acquisition task, information representing that the data acquisition task is created successfully, information representing that the data acquisition task fails to be created, and a reason why the data acquisition task fails to be created.

Optionally, the descriptive information of the acquired target data object may include one or more of the source tag of the acquired target data object, the context acquisition condition of the acquired target data object, and the tag of the acquired target data object.

Optionally, the source tag of the acquired target data object may be an acquired target signaling flow tag or an acquired target layer tag; or, the context acquisition condition of the acquired target data object may include one or more of an acquisition condition and a context object tag, the acquisition condition including a reporting containing instruction and/or a reporting filtering instruction; or, the tag of the acquired target data object may be a message tag in a signaling flow or a data tag in a target layer.

Optionally, the descriptive information of the reporting configuration may include one or more of the reporting triggering event ID, the reporting period, the reporting valid time, and the reporting purpose ID.

Optionally, the descriptive information of the acquisition configuration may include one or more of a User Equipment (UE) sampling rate and a time sampling rate.

Optionally, the operation that the acquisition result is sent to the target node may include that: the acquisition result is sent to the target node through a data distribution protocol.

Optionally, the data distribution protocol may be a Message Queuing Telemetry Transport (MQTT) protocol or a Kalfa protocol; the method may further include that: the task ID is determined as the reporting purpose ID.

Optionally, the data distribution protocol may be a HyperText Transfer Protocol (HTTP); the method may further include that: an ID of the target node is determined as the reporting purpose ID.

Optionally, the first request message may include the information about creation of the data acquisition task; the method may further include that: a second request message is received from the target node, the second request message including the information about updating of the data acquisition task, and a second response message configured to respond to the second request message is sent to the target node.

Optionally, the first request message may include the information about creation of the data acquisition task or the information about updating of the data acquisition task; the method may further include that: a third request message is received from the target node, the third request message including the information about cancellation of the data acquisition task, and a third response message configured to respond to the third request message is sent to the target node.

Optionally, the information about updating of the data acquisition task may include one or more of the task ID of the data acquisition task, descriptive information of a new acquired target data object, descriptive information of a new reporting configuration, and descriptive information of a new acquisition configuration; the first response message or the second response message may include one or more of information representing that the data acquisition task is updated successfully, information representing that the data acquisition task fails to be updated, and a reason why the data acquisition task fails to be updated.

Optionally, the information about cancellation of the data acquisition task may include the task ID of the data acquisition task; the first response message or the third response message may include one or more of information representing that the data acquisition task is canceled successfully, information representing that the data acquisition task tails to be canceled, and a reason why the data acquisition task fails to be canceled.

According to a second aspect of the embodiments of the disclosure, a data processing method is provided, which may be applied to a target node and include that: a first request message is sent to a source node, the first request message including at least one of information about creation of a data acquisition task, information about updating of the data acquisition task, or information about cancellation of the data acquisition task; and a first response message configured to respond to the first request message is received from the source node.

Optionally, the first request message may include the information about creation of the data acquisition task; the method may further include that: an acquisition result is received from the source node, the acquisition result being obtained by the source node by performing data acquisition according to the information about creation of the data acquisition task.

Optionally, the acquisition result may include one or more of a task ID of the data acquisition task, an ID of the source node, and an acquired data object array.

Optionally, the acquired data object array may include one or more of a data object source tag corresponding to a source tag of an acquired target data object, data object context data corresponding to a context acquisition condition of the acquired target data object, and a data object array corresponding to a tag of the acquired target data object, the data object array including one or more of an ID of the data object, a data value of the data object, and data generation time of the data object.

Optionally, the information about creation of the data acquisition task may include one or more of descriptive information of the acquired target data object, descriptive information of a reporting configuration, and descriptive information of an acquisition configuration; the first response message may include one or more of the task ID of the created data acquisition task, information representing that the data acquisition task is created successfully, information representing that the data acquisition task fails to be created, and a reason why the data acquisition task fails to be created.

Optionally, the descriptive information of the acquired target data object may include one or more of the source tag of the acquired target data object, the context acquisition condition of the acquired target data object, and the tag of the acquired target data object.

Optionally, the source tag of the acquired target data object may be an acquired target signaling flow tag or an acquired target layer tag; or, the context acquisition condition of the acquired target data object may include one or more of an acquisition condition and a context object tag, the acquisition condition including a reporting containing instruction and/or a reporting filtering instruction; or, the tag of the acquired target data object may be a message tag in a signaling flow or a data tag in a target layer.

Optionally, the descriptive information of the reporting configuration may include one or more of a reporting triggering event ID, a reporting period, reporting valid time, and a reporting purpose ID.

Optionally, the descriptive information of the acquisition configuration may include one or more of a UE sampling rate and a time sampling rate.

Optionally, the operation that the acquisition result is received from the source node may include that: the acquisition result is received from the source node through a data distribution protocol.

Optionally, the data distribution protocol may be an MQTT protocol or a Kalfa protocol; and the reporting purpose ID may be the task ID.

Optionally, the data distribution protocol may be an HTTP; and the reporting purpose ID may be an ID of the target node.

Optionally, the first request message may include the information about creation of the data acquisition task; the method may further include that: a second request message is sent to the source node, the second request message including the information about updating of the data acquisition task, and a second response message configured to respond to the second request message is received from the source node.

Optionally, the first request message may include the information about creation of the data acquisition task or the information about updating of the data acquisition task; the method may further include that: a third request message is sent to the source node, the third request message including the information about cancellation of the data acquisition task, and a third response message configured to respond to the third request message is received from the source node.

Optionally, the information about updating of the data acquisition task may include one or more of the task ID of the data acquisition task, descriptive information of a new acquired target data object, descriptive information of a new reporting configuration, and descriptive information of a new acquisition configuration; and the first response message or the second response message may include one or more of information representing that the data acquisition task is updated successfully, information representing that the data acquisition task fails to be updated, and a reason why the data acquisition task fails to be updated.

Optionally, the information about cancellation of the data acquisition task may include the task ID of the data acquisition task; and the first response message or the third response message may include one or more of information representing that the data acquisition task is canceled successfully, information representing that the data acquisition task tails to be canceled, and a reason why the data acquisition task fails to be canceled.

According to a third aspect of the embodiments of the disclosure, a source node is provided, which may include a first transceiver and a first processor. The first transceiver may be configured to receive a first request message from a target node, the first request message including at least one of information about creation of a data acquisition task, information about updating of the data acquisition task, or information about cancellation of the data acquisition task. The first transceiver may further be configured to send a first response message configured to respond to the first request message to the target node.

Optionally, the first request message includes the information about creation of the data acquisition task; the first processor is configured to perform data acquisition according to the information about creation of the data acquisition task, and send an acquisition result to the target node.

Optionally, the first processor is further configured to: add a reporting triggering event ID to an event monitor; when the event monitor monitors a triggering event corresponding to the reporting triggering event ID, query a task ID of the data acquisition task corresponding to the reporting triggering event ID; perform data acquisition on a data object corresponding to descriptive information of the acquired target data object according to descriptive information of an acquisition configuration to obtain the acquisition result; set a first timer according to a reporting period, and set a second timer according to reporting valid time; when the first timer is triggered, send the acquisition result to the target node according to a reporting purpose ID; and when the second timer is triggered, clear the first timer and the second timer, and then re-execute the step of querying the task ID of the data acquisition task corresponding to the reporting triggering event ID when the event monitor monitors the triggering event corresponding to the reporting triggering event ID.

Optionally, the acquisition result includes one or more of the task ID of the data acquisition task, an ID of the source node, and an acquired data object array.

Optionally, the acquired data object array includes one or more of a data object source tag corresponding to a source tag of the acquired target data object, data object context data corresponding to a context acquisition condition of the acquired target data object, and a data object array corresponding to a tag of the acquired target data object, the data object array including one or more of an ID of the data object, a data value of the data object, and data generation time of the data object.

Optionally, the information about creation of the data acquisition task includes one or more of the descriptive information of the acquired target data object, descriptive information of a reporting configuration, and the descriptive information of the acquisition configuration; the first response message includes one or more of the task ID of the created data acquisition task, information representing that the data acquisition task is created successfully, information representing that the data acquisition task fails to be created, and a reason why the data acquisition task fails to be created.

Optionally, the descriptive information of the acquired target data object includes one or more of the source tag of the acquired target data object, the context acquisition condition of the acquired target data object, and the tag of the acquired target data object.

Optionally, the source tag of the acquired target data object is an acquired target signaling flow tag or an acquired target layer tag; or, the context acquisition condition of the acquired target data object includes one or more of an acquisition condition and a context object tag, the acquisition condition including a reporting containing instruction and/or a reporting filtering instruction; or, the tag of the acquired target data object is a message tag in a signaling flow or a data tag in a target layer.

Optionally, the descriptive information of the reporting configuration includes one or more of the reporting triggering event ID, the reporting period, the reporting valid time, and the reporting purpose ID.

Optionally, the descriptive information of the acquisition configuration includes one or more of a UE sampling rate and a time sampling rate.

Optionally, the first transceiver is further configured to send the acquisition result to the target node through a data distribution protocol.

Optionally, the data distribution protocol is an MQTT protocol or a Kalfa protocol.

The first processor is further configured to determine the task ID as the reporting purpose ID.

Optionally, the data distribution protocol is an HTTP.

The first processor is further configured to determine an ID of the target node as the reporting purpose ID.

Optionally, the first request message includes the information about creation of the data acquisition task.

The first transceiver is further configured to receive a second request message from the target node, the second request message including the information about updating of the data acquisition task.

The first transceiver is further configured to send a second response message configured to respond to the second request message to the target node.

Optionally, the first request message includes the information about creation of the data acquisition task or the information about updating of the data acquisition task.

The first transceiver is further configured to receive a third request message from the target node, the third request message including the information about cancellation of the data acquisition task.

The first transceiver is further configured to send a third response message configured to respond to the third request message to the target node.

Optionally, the information about updating of the data acquisition task includes one or more of the task ID of the data acquisition task, descriptive information of a new acquired target data object, descriptive information of a new reporting configuration, and descriptive information of a new acquisition configuration; the first response message or the second response message includes one or more of information representing that the data acquisition task is updated successfully, information representing that the data acquisition task fails to be updated, and a reason why the data acquisition task fails to be updated.

Optionally, the information about cancellation of the data acquisition task includes the task ID of the data acquisition task; the first response message or the third response message includes one or more of information representing that the data acquisition task is canceled successfully, information representing that the data acquisition task fails to be canceled, and a reason why the data acquisition task fails to be canceled.

According to a fourth aspect of the embodiments of the disclosure, a target node is provided, which may include a second transceiver and a second processor. The second transceiver may be configured to send a first request message to a source node, the first request message including at least one of information about creation of a data acquisition task, information about updating of the data acquisition task, or information about cancellation of the data acquisition task. The second transceiver may further be configured to receive a first response message configured to respond to the first request message from the source node.

Optionally, the first request message includes the information about creation of the data acquisition task; the second transceiver is further configured to receive an acquisition result from the source node, the acquisition result being obtained by the source node by performing data acquisition according to the information about creation of the data acquisition task.

Optionally, the acquisition result includes one or more of a task ID of the data acquisition task, an ID of the source node, and an acquired data object array.

Optionally, the acquired data object array includes one or more of a data object source tag corresponding to a source tag of an acquired target data object, data object context data corresponding to a context acquisition condition of the acquired target data object, and a data object array corresponding to a tag of the acquired target data object, the data object array including one or more of an ID of the data object, a data value of the data object, and data generation time of the data object.

Optionally, the information about creation of the data acquisition task includes one or more of descriptive information of the acquired target data object, descriptive information of a reporting configuration, and descriptive information of an acquisition configuration; the first response message includes one or more of the task ID of the created data acquisition task, information representing that the data acquisition task is created successfully, information representing that the data acquisition task fails to be created, and a reason why the data acquisition task fails to be created.

Optionally, the descriptive information of the acquired target data object includes one or more of the source tag of the acquired target data object, the context acquisition condition of the acquired target data object, and the tag of the acquired target data object.

Optionally, the source tag of the acquired target data object is an acquired target signaling flow tag or an acquired target layer tag; or, the context acquisition condition of the acquired target data object may include one or more of an acquisition condition and a context object tag, the acquisition condition including a reporting containing instruction and/or a reporting filtering instruction; or, the tag of the acquired target data object may be a message tag in a signaling flow or a data tag in a target layer.

Optionally, the descriptive information of the reporting configuration includes one or more of a reporting triggering event ID, a reporting period, reporting valid time, and a reporting purpose ID.

Optionally, the descriptive information of the acquisition configuration includes one or more of a UE sampling rate and a time sampling rate.

Optionally, the second transceiver is further configured to receive the acquisition result from the source node through a data distribution protocol.

Optionally, the data distribution protocol is an MQTT protocol or a Kalfa protocol; and the reporting purpose ID is the task ID.

Optionally, the data distribution protocol is an HTTP; and the reporting purpose ID is an ID of the target node.

Optionally, the first request message includes the information about creation of the data acquisition task.

The second transceiver is further configured to send a second request message to the source node, the second request message including the information about updating of the data acquisition task.

The second transceiver is further configured to receive a second response message configured to respond to the second request message from the source node.

Optionally, the first request message includes the information about creation of the data acquisition task or the information about updating of the data acquisition task.

The second transceiver is further configured to send a third request message to the source node, the third request message including the information about cancellation of the data acquisition task.

The second transceiver is further configured to receive a third response message configured to respond to the third request message from the source node.

Optionally, the information about updating of the data acquisition task includes one or more of the task ID of the data acquisition task, descriptive information of a new acquired target data object, descriptive information of new reporting configuration, and descriptive information of a new acquisition configuration; and the first response message or the second response message includes one or more of information representing that the data acquisition task is updated successfully, information representing that the data acquisition task fails to be updated, and a reason why the data acquisition task fails to be updated.

Optionally, the information about cancellation of the data acquisition task includes the task ID of the data acquisition task; and the first response message or the third response message may include one or more of information representing that the data acquisition task is canceled successfully, information representing that the data acquisition task tails to be canceled, and a reason why the data acquisition task fails to be canceled.

According to a fifth aspect of the embodiments of the disclosure, a communication device is provided, which may include a processor, a memory, and a program stored in the memory and capable of running in the processor, the program being executed by the processor to implement the steps of the data processing method as described in the first aspect or the steps of the data processing method as described in the second aspect.

According to a sixth aspect of the embodiments of the disclosure, a computer-readable storage medium is provided, in which a computer program may be stored, the computer program being executed by a processor to implement the steps of the data processing method as described in the first aspect or the steps of the data processing method as described in the second aspect.

In the embodiments of the disclosure, the source node performs data processing of creating the data acquisition task, updating information about the data acquisition task, or canceling the data acquisition task according to the first request message from the target node, so that higher flexibility in data processing is achieved.

BRIEF DESCRIPTION OF THE DRAWINGS

In order to describe the technical solutions of the embodiments of the disclosure more clearly, the drawings required to be used in the descriptions about the embodiments of the disclosure will be simply introduced below. It is apparent that the drawings described below are merely some embodiments of the disclosure. Other drawings may further be obtained by those of ordinary skill in the art according to these drawings without creative work.

DETAILED DESCRIPTION

The technical solutions in the embodiments of the disclosure will be clearly and completely described below in combination with the drawings in the embodiments of the disclosure. It is apparent that the described embodiments are not all embodiments but part of embodiments of the disclosure. All other embodiments obtained by those of ordinary skill in the art on the basis of the embodiments in the disclosure without creative work shall fall within the scope of protection of the disclosure.

Figure 1:
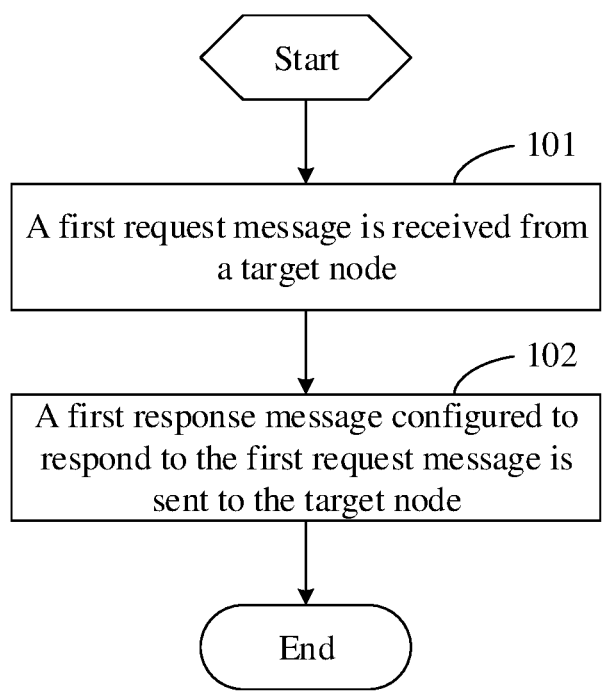
FIG. 1 is a first schematic flowchart of a data processing method according to an embodiment of the disclosure.

Referring to FIG. 1, an embodiment of the disclosure provides a data processing method. An execution body of the method is a source node. The following specific operations are included.

In 101, a first request message is received from a target node.

In the embodiment of the disclosure, the first request message includes at least one of information about creation of a data acquisition task, information about updating of the data acquisition task, or information about cancellation of the data acquisition task.

In 102, a first response message configured to respond to the first request message is sent to the target node.

Figure 2:
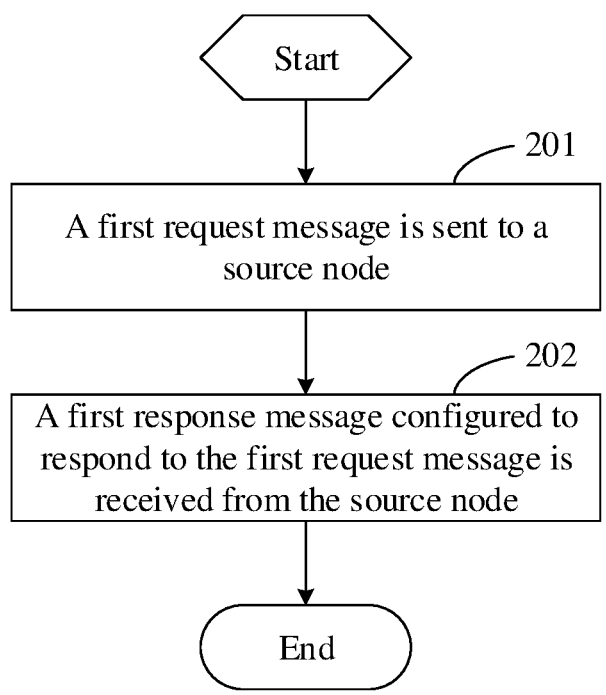
FIG. 2 is a second schematic flowchart of a data processing method according to an embodiment of the disclosure.

Referring to FIG. 2, an embodiment of the disclosure provides a data processing method. An execution body of the method is a target node. The following specific operations are included.

In 201, a first request message is sent to a source node.

In the embodiment of the disclosure, the first request message includes at least one of information about creation of a data acquisition task, information about updating of the data acquisition task, or information about cancellation of the data acquisition task.

In 202, a first response message configured to respond to the first request message is received from the source node.

In the embodiment of the disclosure, the source node performs data processing of creating the data acquisition task, updating information about the data acquisition task, or canceling the data acquisition task according to the first request message from the target node, so that higher flexibility in data processing is achieved.

Figure 3:
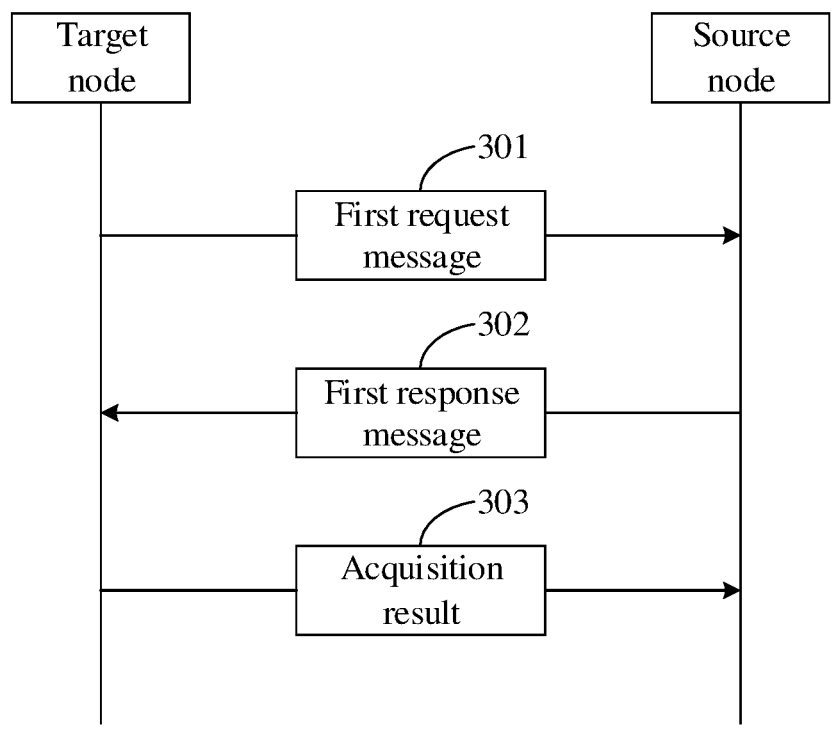
FIG. 3 is a third schematic flowchart of a data processing method according to an embodiment of the disclosure.

For the condition that the first request message includes the information about creation of the data acquisition task, referring to FIG. 3, an embodiment of the disclosure provides a data processing method. The following specific operations are included.

In 301, a target node sends a first request message to a source node.

In the embodiment of the disclosure, the first request message includes information about creation of a data acquisition task.

Optionally, the information about creation of the data acquisition task includes descriptive information of an acquired target data object, descriptive information of a reporting configuration, and descriptive information of an acquisition configuration.

Furthermore, the descriptive information of the acquired target data object includes:

a source tag of the acquired target data object, the source tag of the acquired target data object being mainly configured to identify a source of the acquired target data object, and being an acquired target signaling flow tag or an acquired target layer tag, for example, a port Physical layer (PHY) tag, a Multiple Access Channel (MAC) tag, a system tag, and a Radio Resource Control (RRC) tag;

a context acquisition condition of the acquired target data object, the context acquisition condition of the acquired target data object including an acquisition condition and a context object tag, for example, a UEID, a cell ID, a Radio Bear Identity (RBID), and a signaling flow state, and the acquisition condition including a reporting containing instruction and/or a reporting filtering instruction, for example, a UE ID filtering instruction and a flow state filtering instruction; and a tag of the acquired target data object, the tag of the acquired target data object being mainly configured to identify a data object tag in the source of the acquired target data object, and being a data tag in a signaling flow or a data tag in a target layer, for example, a Channel Quality Indicator (CQI) in a signaling flow such as PHY.

Furthermore, the descriptive information of the reporting configuration includes a reporting triggering event ID, a reporting period, reporting valid time, and a reporting purpose ID.

Furthermore, the descriptive information of the acquisition configuration includes a UE sampling rate and a time sampling rate, and is configured to represent information only valid to non-signaling data acquisition.

In 302, a first response message sent by the source node to the target node and configured to respond to the first request message is received.

In the embodiment of the disclosure, when the data acquisition task is created successfully, the first response message includes a task ID of the created data acquisition task and information representing that the data acquisition task is created successfully.

When the data acquisition task fails to be created, the first response message includes information representing that the data acquisition task fails to be created and a reason why the data acquisition task fails to be created.

In 303, data acquisition is performed according to information about creation of a data acquisition task, and an acquisition result is sent to the target node.

In the embodiment of the disclosure, the source node performs data acquisition according to a content in the information about creation of the data acquisition task.

Specifically, data acquisition includes the following specific operations.

In (1), the reporting triggering event ID is added to an event monitor.

In (2), when the event monitor monitors a triggering event corresponding to the reporting triggering event ID, the task ID of the data acquisition task corresponding to the reporting triggering event ID is queried.

In (2), data acquisition is performed on the data object corresponding to the descriptive information of the acquired target data object according to the descriptive information of the acquisition configuration to obtain the acquisition result.

In (3), a first timer is set according to the reporting period, and a second timer is set according to the reporting valid time.

In (4), when the first timer is triggered, the acquisition result is sent to the target node according to the reporting purpose ID.

In (5), when the second timer is triggered, the first timer and the second timer are cleared, and then (2) is re-executed.

Furthermore, the acquisition result includes the task ID of the data acquisition task, an ID of the source node, and an acquired data object array.

Optionally, the acquisition result further includes reporting time.

The acquired data object array includes:

a data object source tag corresponding to the source tag of the acquired target data object;

data object context data corresponding to the context acquisition condition of the acquired target data object, for example, the UEID, the cell ID, the RBID, and the signaling flow state;

a data object array corresponding to the tag of the acquired target data object.

Optionally, the acquired data object array further includes acquired data packing time, a data object type (for example, signaling or non-signaling), and acquisition time of the data object.

Furthermore, the data object array includes one or more of an ID of the data object, a data value of the data object, and data generation time of the data object.

It is to be noted that a relationship between a data object source and a data object is that a data object source may include multiple data objects. For example, when the data object source is a signaling flow, the object data may be a message in the flow. For another example, when the data object source is PHY, the data object may be a parameter such as the CQI in PHY.

Optionally, the source node sends the acquisition result to the target node through a data distribution protocol.

In the embodiment of the disclosure, the data distribution protocol is an MQTT protocol, a Kafka protocol, and an HTTP.

Furthermore, when the data distribution protocol is the MQTT protocol or the Kafka protocol, the task ID is determined as the reporting purpose ID. When the data distribution protocol is the HTTP, an ID of the target node is determined as the reporting purpose ID.

The data distribution protocol may be used to form a data acquisition sharing mechanism. For example, when a data subject is set as a task ID, different task IDs are created according to different data uses and data ranges (for example, acquisition of different types of signaling or data of different layers determined as different tasks), and multiple target nodes may subscribe to data of corresponding task ID subjects according to data using needs, to implement data acquisition and distribution sharing, thereby reducing reporting of the source node.

In the embodiment of the disclosure, the source node performs data acquisition according to the information about creation of the data acquisition task in the first request message from the target node, acquisition of various types of signaling and non-signaling data may be simultaneously supported, data to be acquired is clipped and configured flexibly, a data content to be acquired, an acquisition manner, and a reporting manner are specified, data acquisition under different acquisition configurations of multiple target nodes may be simultaneously supported, and a data sharing mechanism for data acquisition of multiple target nodes is supported.

Figure 4:
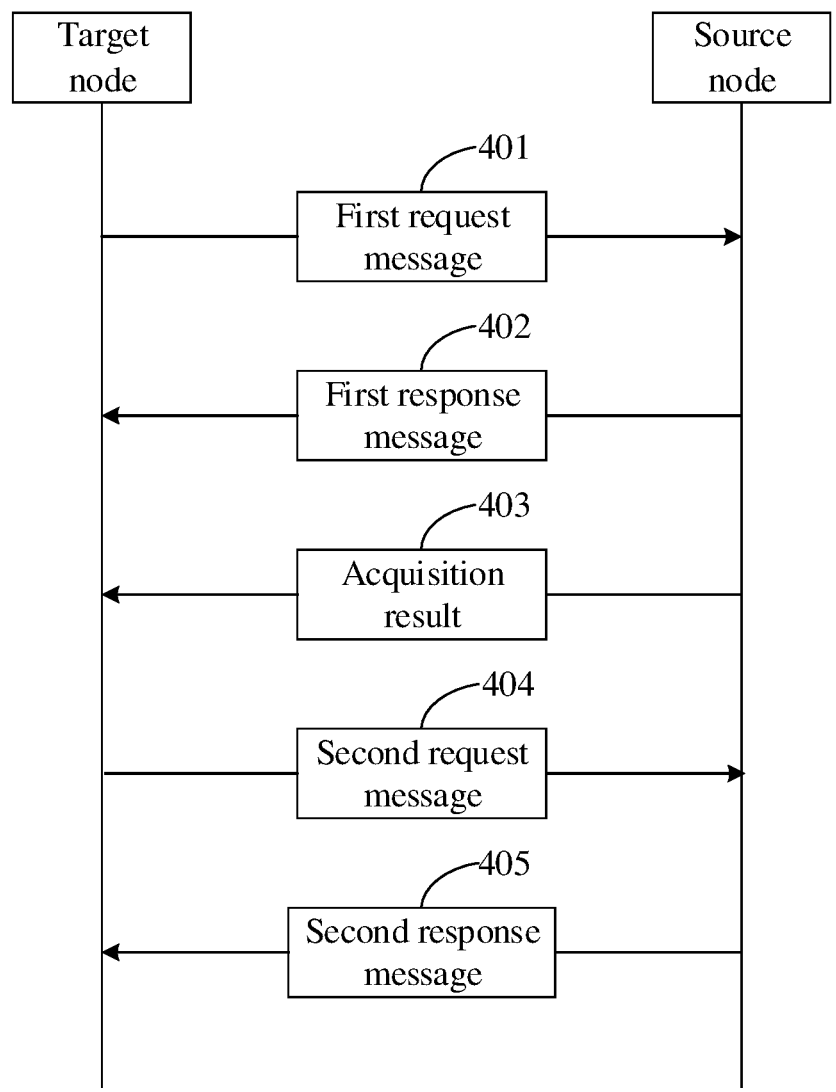
FIG. 4 is a fourth schematic flowchart of a data processing method according to an embodiment of the disclosure.

For the condition that the first request message includes the information about creation of the data acquisition task, referring to FIG. 4, an embodiment of the disclosure provides a data processing method. The following specific operations are included.

In 401, a target node sends a first request message to a source node.

In 402, the target node receives a first response message configured to respond to the first request message from the source node.

In 403, the source node performs data acquisition according to information about creation of a data acquisition task, and sends an acquisition result to the target node.

The descriptions of 401 to 403 may refer to the descriptions of 301 to 303 in FIG. 3, and elaborations are omitted here.

In 404, the source node receives a second request message from the target node.

In the embodiment of the disclosure, the second request message includes information about updating of the data acquisition task.

Furthermore, the information about updating of the data collection task includes a task ID of the data collection task, descriptive information of a new acquired data target object, descriptive information of a new reporting configuration, and descriptive information of a new acquisition configuration.

In 405, the source node sends a second response message configured to respond to the second request message to the target node.

In the embodiment of the disclosure, when the data acquisition task is updated successfully, the second response message includes information representing that the data acquisition task is updated successfully.

When the data acquisition task fails to be updated, the second response message includes information representing that the data acquisition task fails to be updated and a reason why the data acquisition task fails to be updated.

In the embodiment of the disclosure, after the data acquisition task is completed, the source node updates the data acquisition task according to the second request message sent by the target node to obtain the descriptive information of the new acquired data target object, the descriptive information of the new reporting configuration, and the descriptive information of the new acquisition configuration for data acquisition according to a new requirement.

Figure 5:
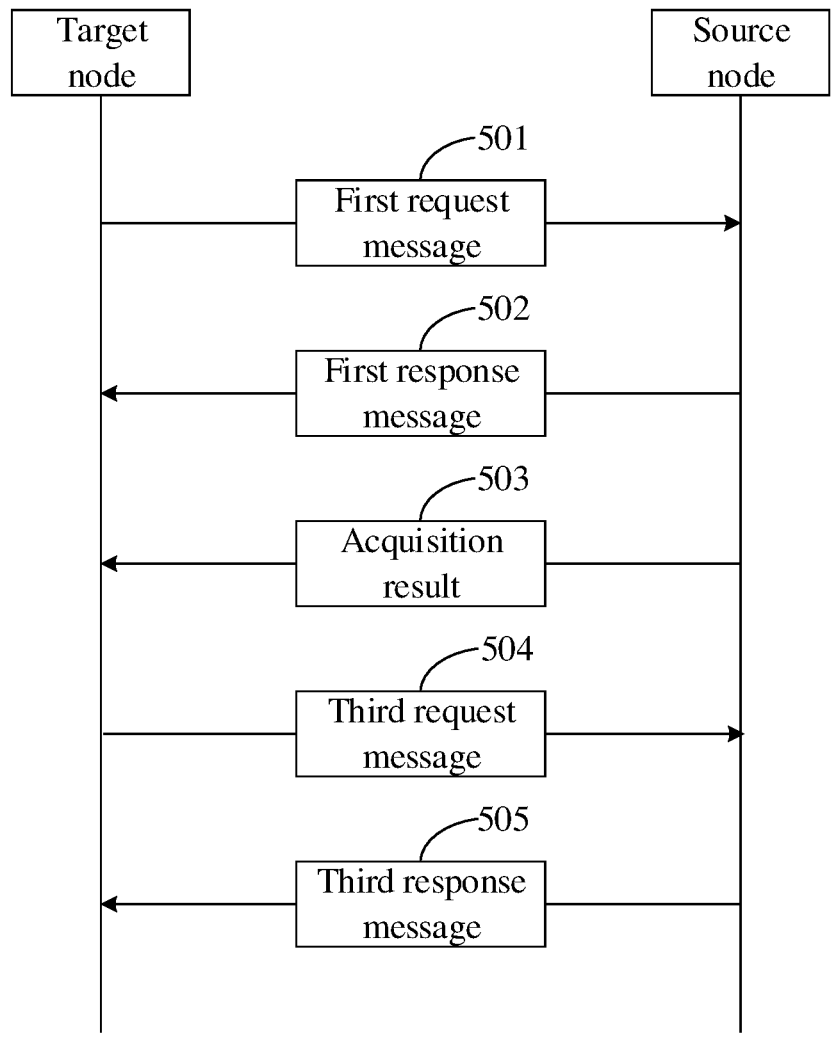
FIG. 5 is a fifth schematic flowchart of a data processing method according to an embodiment of the disclosure.

For the condition that the first request message includes the information about creation of the data acquisition task, referring to FIG. 5, an embodiment of the disclosure provides another data processing method. The following specific operations are included.

In 501, a target node sends a first request message to a source node.

In 502, the target node receives a first response message configured to respond to the first request message from the source node.

In 503, the source node performs data acquisition according to information about creation of a data acquisition task, and sends an acquisition result to the target node.

The descriptions of 501 to 503 may refer to the descriptions of 301 to 303 in FIG. 3, and elaborations are omitted here.

In 504, the source node receives a third request message from the target node.

In the embodiment of the disclosure, the third request message includes information about cancellation of the data acquisition task.

Furthermore, the information about cancellation of the data acquisition task includes a task ID of the data acquisition task.

In 505, the source node sends a third response message configured to respond to the third request message to the target node.

In the embodiment of the disclosure, when the data acquisition task is canceled successfully, the third response message includes information representing that the data acquisition task is canceled successfully.

When the data acquisition task fails to be canceled, the third response message includes information representing that the data acquisition task fails to be canceled and a reason why the data acquisition task fails to be canceled.

In the embodiment of the disclosure, after the data acquisition task is completed, the source node may cancel the data acquisition task according to the third request message sent by the target node, and feed back a task cancellation result through the third response message.

Figure 6:
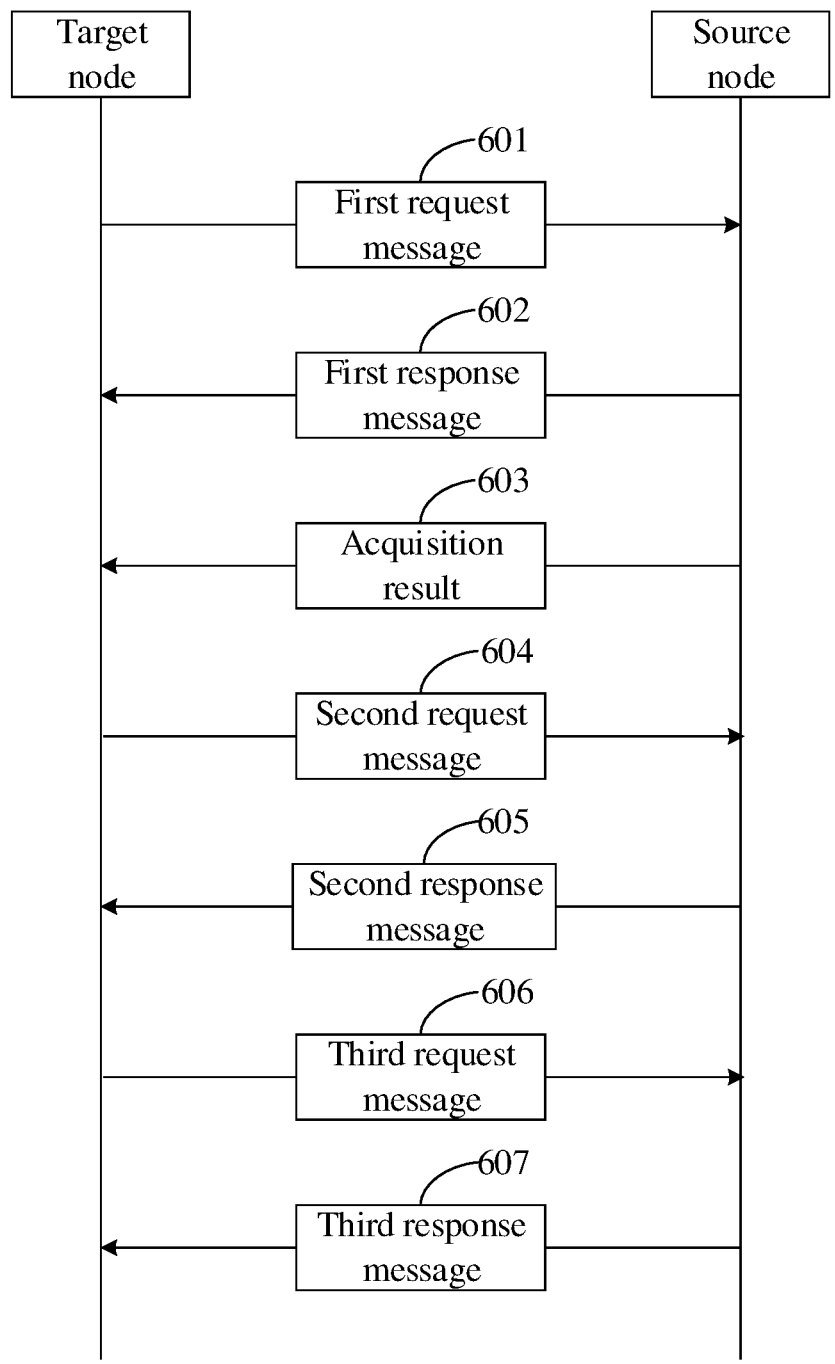
FIG. 6 is a sixth schematic flowchart of a data processing method according to an embodiment of the disclosure.

Referring to FIG. 6, an embodiment of the disclosure provides another data processing method. The following specific operations are included.

In 601, a target node sends a first request message to a source node.

In 602, the target node receives a first response message configured to respond to the first request message from the source node.

In 603, the source node performs data acquisition according to information about creation of a data acquisition task, and sends an acquisition result to the target node.

The descriptions of 601 to 603 may refer to the descriptions of 301 to 303 in FIG. 3, and elaborations are omitted here.

In 604, the source node receives a second request message from the target node.

In 605, the source node sends a second response message configured to respond to the second request message to the target node.

The descriptions of 604 and 605 may refer to the descriptions of 404 and 405 in FIG. 4, and elaborations are omitted here.

In 606, the source node receives a third request message from the target node.

In 607, the source node sends a third response message configured to respond to the third request message to the target node.

The descriptions of 606 and 607 may refer to the descriptions of 504 and 505 in FIG. 5, and elaborations are omitted here.

In the embodiment of the disclosure, the source node completes a process including creation of a data acquisition task, data acquisition, updating of the data acquisition task, and cancellation of the data acquisition task according to the request messages sent by the target node.

Figure 7:
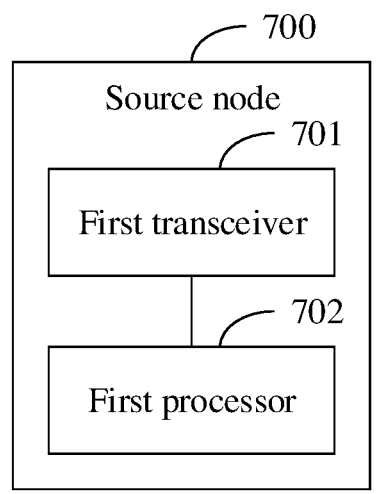
FIG. 7 is a structure diagram of a source node according to an embodiment of the disclosure.

Referring to FIG. 7, an embodiment of the disclosure provides a source node 700, which includes a first transceiver 701 and a first processor 702.

The first transceiver 701 is configured to receive a first request message from a target node, the first request message including at least one of information about creation of a data acquisition task, information about updating of the data acquisition task, or information about cancellation of the data acquisition task.

The first transceiver 701 is further configured to send a first response message configured to respond to the first request message to the target node.

Optionally, the first request message includes the information about creation of the data acquisition task.

The first processor 702 is configured to perform data acquisition according to the information about creation of the data acquisition task, and send an acquisition result to the target node.

Optionally, the first processor 702 is further configured to: add a reporting triggering event ID to an event monitor; when the event monitor monitors a triggering event corresponding to the reporting triggering event ID, query a task ID of the data acquisition task corresponding to the reporting triggering event ID; perform data acquisition on a data object corresponding to descriptive information of the acquired target data object according to descriptive information of an acquisition configuration to obtain the acquisition result; set a first timer according to a reporting period, and set a second timer according to reporting valid time; when the first timer is triggered, send the acquisition result to the target node according to a reporting purpose ID; and when the second timer is triggered, clear the first timer and the second timer, and then re-execute the step of querying the task ID of the data acquisition task corresponding to the reporting triggering event ID when the event monitor monitors the triggering event corresponding to the reporting triggering event ID.

Optionally, the acquisition result includes one or more of the task ID of the data acquisition task, an ID of the source node, and an acquired data object array.

Optionally, the acquired data object array includes one or more of a data object source tag corresponding to a source tag of the acquired target data object, data object context data corresponding to a context acquisition condition of the acquired target data object, and a data object array corresponding to a tag of the acquired target data object, the data object array including one or more of an ID of the data object, a data value of the data object, and data generation time of the data object.

Optionally, the information about creation of the data acquisition task includes one or more of the descriptive information of the acquired target data object, descriptive information of a reporting configuration, and the descriptive information of the acquisition configuration. The first response message includes one or more of the task ID of the created data acquisition task, information representing that the data acquisition task is created successfully, information representing that the data acquisition task fails to be created, and a reason why the data acquisition task fails to be created.

Optionally, the descriptive information of the acquired target data object includes one or more of the source tag of the acquired target data object, the context acquisition condition of the acquired target data object, and the tag of the acquired target data object.

Optionally, the source tag of the acquired target data object is an acquired target signaling flow tag or an acquired target layer tag. Or, the context acquisition condition of the acquired target data object includes one or more of an acquisition condition and a context object tag, the acquisition condition including a reporting containing instruction and/or a reporting filtering instruction. Or, the tag of the acquired target data object is a message tag in a signaling flow or a data tag in a target layer.

Optionally, the descriptive information of the reporting configuration includes one or more of the reporting triggering event ID, the reporting period, the reporting valid time, and the reporting purpose ID.

Optionally, the descriptive information of the acquisition configuration includes one or more of a UE sampling rate and a time sampling rate.

Optionally, the first transceiver 701 is further configured to send the acquisition result to the target node through a data distribution protocol.

Optionally, the data distribution protocol is an MQTT protocol or a Kalfa protocol.

The first processor 702 is further configured to determine the task ID as the reporting purpose ID.

Optionally, the data distribution protocol is an HTTP.

The first processor 702 is further configured to determine an ID of the target node as the reporting purpose ID.

Optionally, the first request message includes the information about creation of the data acquisition task.

The first transceiver 701 is further configured to receive a second request message from the target node, the second request message including the information about updating of the data acquisition task.

The first transceiver 701 is further configured to send a second response message configured to respond to the second request message to the target node.

Optionally, the first request message includes the information about creation of the data acquisition task or the information about updating of the data acquisition task.

The first transceiver 701 is further configured to receive a third request message from the target node, the third request message including the information about cancellation of the data acquisition task.

The first transceiver 701 is further configured to send a third response message configured to respond to the third request message to the target node.

Optionally, the information about updating of the data acquisition task includes one or more of the task ID of the data acquisition task, descriptive information of a new acquired target data object, descriptive information of a new reporting configuration, and descriptive information of a new acquisition configuration. The first response message or the second response message includes one or more of information representing that the data acquisition task is updated successfully, information representing that the data acquisition task fails to be updated, and a reason why the data acquisition task fails to be updated.

Optionally, the information about cancellation of the data acquisition task includes the task ID of the data acquisition task. The first response message or the third response message includes one or more of information representing that the data acquisition task is canceled successfully, information representing that the data acquisition task tails to be canceled, and a reason why the data acquisition task fails to be canceled.

In the embodiment of the disclosure, the source node performs data processing of creating the data acquisition task, updating information about the data acquisition task, or canceling the data acquisition task according to the first request message from the target node, so that higher flexibility in data processing is achieved.

Figure 8:
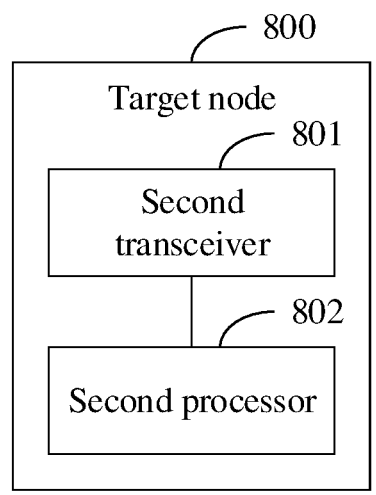
FIG. 8 is a structure diagram of a target node according to an embodiment of the disclosure.

Referring to FIG. 8, an embodiment of the disclosure provides a target node 800, which includes a second transceiver 801 and a second processor 802.

The second transceiver 801 is configured to send a first request message to a source node, the first request message including at least one of information about creation of a data acquisition task, information about updating of the data acquisition task, or information about cancellation of the data acquisition task.

The second transceiver 801 is further configured to receive a first response message configured to respond to the first request message from the source node.

Optionally, the first request message includes the information about creation of the data acquisition task.

The second transceiver 801 is further configured to receive an acquisition result from the source node, the acquisition result being obtained by the source node by performing data acquisition according to the information about creation of the data acquisition task.

Optionally, the acquisition result includes one or more of a task ID of the data acquisition task, an ID of the source node, and an acquired data object array.

Optionally, the acquired data object array includes one or more of a data object source tag corresponding to a source tag of an acquired target data object, data object context data corresponding to a context acquisition condition of the acquired target data object, and a data object array corresponding to a tag of the acquired target data object, the data object array including one or more of an ID of the data object, a data value of the data object, and data generation time of the data object.

Optionally, the information about creation of the data acquisition task includes one or more of descriptive information of the acquired target data object, descriptive information of a reporting configuration, and descriptive information of an acquisition configuration. The first response message includes one or more of the task ID of the created data acquisition task, information representing that the data acquisition task is created successfully, information representing that the data acquisition task fails to be created, and a reason why the data acquisition task fails to be created.

Optionally, the descriptive information of the acquired target data object includes one or more of the source tag of the acquired target data object, the context acquisition condition of the acquired target data object, and the tag of the acquired target data object.

Optionally, the source tag of the acquired target data object is an acquired target signaling flow tag or an acquired target layer tag. Or, the context acquisition condition of the acquired target data object includes one or more of an acquisition condition and a context object tag, the acquisition condition including a reporting containing instruction and/or a reporting filtering instruction. Or, the tag of the acquired target data object is a message tag in a signaling flow or a data tag in a target layer.

Optionally, the descriptive information of the reporting configuration includes one or more of a reporting triggering event ID, a reporting period, reporting valid time, and a reporting purpose ID.

Optionally, the descriptive information of the acquisition configuration includes one or more of a UE sampling rate and a time sampling rate.

Optionally, the second transceiver 801 is further configured to receive the acquisition result from the source node through a data distribution protocol.

Optionally, the data distribution protocol is an MQTT protocol or a Kalfa protocol. The reporting purpose ID is the task ID.

Optionally, the data distribution protocol is an HTTP. The reporting purpose ID is an ID of the target node.

Optionally, the first request message includes the information about creation of the data acquisition task.

The second transceiver 801 is further configured to send a second request message to the source node, the second request message including the information about updating of the data acquisition task.

The second transceiver 801 is further configured to receive a second response message configured to respond to the second request message from the source node.

Optionally, the first request message includes the information about creation of the data acquisition task or the information about updating of the data acquisition task.

The second transceiver 801 is further configured to send a third request message to the source node, the third request message including the information about cancellation of the data acquisition task.

The second transceiver 801 is further configured to receive a third response message configured to respond to the third request message from the source node.

Optionally, the information about updating of the data acquisition task includes one or more of the task ID of the data acquisition task, descriptive information of a new acquired target data object, descriptive information of a new reporting configuration, and descriptive information of a new acquisition configuration. The first response message or the second response message includes one or more of information representing that the data acquisition task is updated successfully, information representing that the data acquisition task fails to be updated, and a reason why the data acquisition task fails to be updated.

Optionally, the information about cancellation of the data acquisition task includes the task ID of the data acquisition task. The first response message or the third response message includes one or more of information representing that the data acquisition task is canceled successfully, information representing that the data acquisition task tails to be canceled, and a reason why the data acquisition task fails to be canceled.

In the embodiment of the disclosure, the source node performs data processing of creating the data acquisition task, updating information about the data acquisition task, or canceling the data acquisition task according to the first request message from the target node, so that higher flexibility in data processing is achieved.

Figure 9:
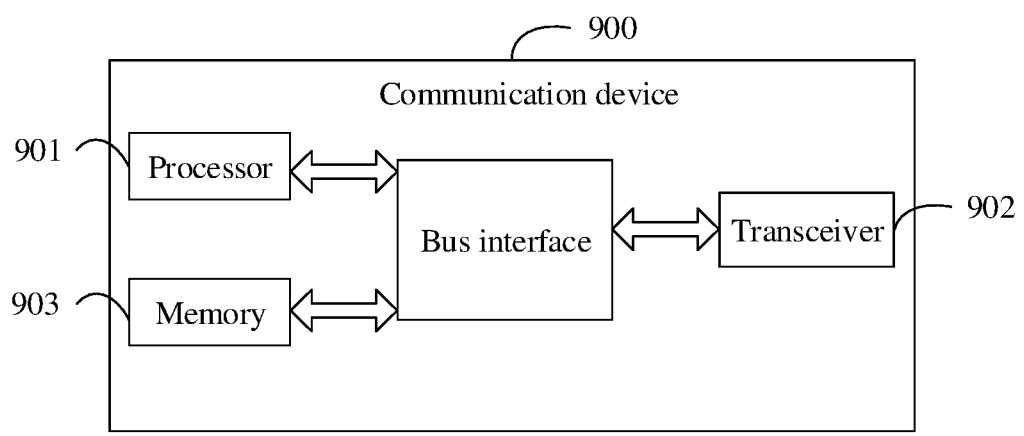
FIG. 9 is a structure diagram of a communication device according to an embodiment of the disclosure.

Referring to FIG. 9, an embodiment of the disclosure provides a communication device 900, which includes a processor 901, a transceiver 902, a memory 903, and a bus interface.

The processor 901 may be responsible for management over a bus architecture and general processing. The memory 903 may store data used by the processor 901 when executing operations.

In the embodiment of the disclosure, the communication device 900 may further include a program stored in the memory 903 and capable of running in the processor 901. The processor is executed by the processor 901 to implement the steps of the method provided in the embodiments of the disclosure.

In FIG. 9, the bus architecture may include any numbers of interconnected buses and bridges, and specifically connects various circuits of one or more processors represented by the processor 901 and a memory represented by the memory 903. The bus architecture may also connect various other circuits such as a peripheral device, a voltage stabilizer, and a power management circuit. These are well known in the art, and thus further descriptions are omitted in the embodiment of the disclosure. The bus interface provides an interface. The transceiver 902 may be multiple elements, namely including a sender and a receiver, and provides units configured to communicate with another apparatus through a transmission medium.

An embodiment of the disclosure also provides a computer-readable storage medium, in which a computer program is stored. The computer program is executed by a processor to implement each process in the method embodiment. The same technical effects may be achieved. To avoid repetitions, elaborations are omitted here. The computer-readable storage medium is, for example, a Read-Only Memory (ROM), a Random Access Memory (RAM), a magnetic disk, or an optical disk.

It is to be noted that terms "include" and "contain" or any other variant thereof is intended to cover nonexclusive inclusions herein, so that a process, method, object, or apparatus including a series of elements not only includes those elements but also includes other elements which are not clearly listed or further includes elements intrinsic to the process, the method, the object, or the apparatus. Under the condition of no more limitations, an element defined by the statement "including a/an . . . " does not exclude existence of the same other elements in a process, method, object, or apparatus including the element.

The embodiments of the disclosure are described above in combination with the drawings, but the disclosure is not limited to the abovementioned specific implementation modes. The abovementioned specific implementation modes are not restrictive but only schematic, those of ordinary skill in the art may be inspired by the disclosure to implement many forms without departing from the purpose of the disclosure and the scope of protection of the claims, and all shall fall within the scope of protection of the disclosure.

The invention claimed is:

1. A data processing method, applied to a source node, the method comprising:
   receiving a first request message from a target node, wherein the first request message comprises information about creation of a data acquisition task; and
   sending a first response message configured to respond to the first request message to the target node;
   wherein the information about creation of the data acquisition task comprises descriptive information of an acquired target data object;
   wherein the descriptive information of the acquired target data object comprises a context acquisition condition of the acquired target data object and a tag of the acquired target data object;
   wherein the context acquisition condition of the acquired target data object comprises an acquisition condition, the acquisition condition comprising at least one of a reporting containing instruction or a reporting filtering instruction;
   wherein the tag of the acquired target data object is a message tag in a signaling flow or a data tag in a target layer;
   wherein the method further comprises:
      performing data acquisition according to the information about creation of the data acquisition task, and sending an acquisition result to the target node; and
   wherein performing data acquisition according to the information about creation of the data acquisition task and sending the acquisition result to the target node comprises:
      adding a reporting triggering event Identity (ID) to an event monitor;
      in a case where the event monitor monitors a triggering event corresponding to the reporting triggering event ID, querying a task ID of the data acquisition task corresponding to the reporting triggering event ID;
      performing data acquisition on a data object corresponding to the descriptive information of the acquired target data object according to descriptive information of an acquisition configuration to obtain the acquisition result.
      setting a first timer according to a reporting period, and setting a second timer according to reporting valid time;
      in a case where the first timer is triggered, sending the acquisition result to the target node according to a reporting purpose ID; and
      in a case where the second timer is triggered, clearing the first timer and the second timer, and then re-executing the step of querying the task ID of the data acquisition task corresponding to the reporting triggering event ID in the case where the event monitor monitors the triggering event corresponding to the reporting triggering event ID.

2. The method of claim 1, wherein one of the following applies:
   when the data acquisition task is created successfully, the first response message includes the task ID of the data acquisition task and information representing that the data acquisition task is created successfully; or
   when the data acquisition task fails to be created, the first response message includes information representing that the data acquisition task fails to be created and a reason why the data acquisition task fails to be created.

3. The method of claim 1, wherein the acquisition result comprises at least one of the task ID of the data acquisition task, an ID of the source node, or an acquired data object array.

4. The method of claim 3, wherein the acquired data object array comprises at least one of:
   data object context data corresponding to the context acquisition condition of the acquired target data object; or
   a data object array corresponding to the tag of the acquired target data object,
   the data object array comprising at least one of an ID of the data object, a data value of the data object, or data generation time of the data object.

5. The method of claim 1, wherein the information about creation of the data acquisition task further comprises at least one of descriptive information of a reporting configuration or the descriptive information of the acquisition configuration.

6. The method of claim 5, wherein:
   the descriptive information of the reporting configuration comprises at least one of the reporting triggering event ID, the reporting period, the reporting valid time, or the reporting purpose ID; or
   the descriptive information of the acquisition configuration comprises at least one of a User Equipment (UE) sampling rate or a time sampling rate.

7. The method of claim 1, wherein sending the acquisition result to the target node comprises:
   sending the acquisition result to the target node through a data distribution protocol.

8. The method of claim 7, wherein:
   the data distribution protocol is a Message Queuing Telemetry Transport (MQTT) protocol or a Kalfa protocol; and the method further comprises: determining the task ID as the reporting purpose ID; or, the data distribution protocol is a HyperText Transfer Protocol (HTTP); and the method further comprises: determining an ID of the target node as the reporting purpose ID.

9. The method of claim 5, wherein the method further comprises:
receiving a second request message from the target node, the second request message comprising information about updating of the data acquisition task; and
sending a second response message configured to respond to the second request message to the target node; or,
the method further comprises:
receiving a third request message from the target node, the third request message comprising information about cancellation of the data acquisition task, and
sending a third response message configured to respond to the third request message to the target node.

10. The method of claim 1, wherein the first request message further comprises information about updating of the data acquisition task;
wherein the information about updating of the data acquisition task comprises at least one of the task ID of the data acquisition task, descriptive information of a new acquired data target object, descriptive information of a new reporting configuration, or descriptive information of a new acquisition configuration;
the first response message or a second response message comprises at least one of: information representing that the data acquisition task is updated successfully, information representing that the data acquisition task fails to be updated, or a reason why the data acquisition task fails to be updated.

11. The method of claim 1, wherein the first request message further comprises information about cancellation of the data acquisition task;
wherein the information about cancellation of the data acquisition task comprises the task ID of the data acquisition task;
the first response message or a third response message comprises at least one of: information representing that the data acquisition task is canceled successfully, information representing that the data acquisition task fails to be canceled, or a reason why the data acquisition task fails to be canceled.

12. A communication device, comprising a processor, a memory, and a computer-readable program stored in the memory and capable of running in the processor, wherein the computer-readable program is executed by the processor to implement operations comprising:
receiving a first request message from a target node, the first request message comprising information about creation of a data acquisition task; and sending a first response message configured to respond to the first request message to the target node;
wherein the information about creation of the data acquisition task comprises descriptive information of an acquired target data object;
wherein the descriptive information of the acquired target data object comprises a context acquisition condition of the acquired target data object and a tag of the acquired target data object;
wherein the context acquisition condition of the acquired target data object comprises an acquisition condition, the acquisition condition comprising at least one of a reporting containing instruction or a reporting filtering instruction;
wherein the tag of the acquired target data object is a message tag in a signaling flow or a data tag in a target layer;
wherein the operations further comprise:
performing data acquisition according to the information about creation of the data acquisition task, and sending an acquisition result to the target node; and
wherein performing data acquisition according to the information about creation of the data acquisition task and sending the acquisition result to the target node comprises:
adding a reporting triggering event Identity (ID) to an event monitor;
in a case where the event monitor monitors a triggering event corresponding to the reporting triggering event ID, querying a task ID of the data acquisition task corresponding to the reporting triggering event ID;
performing data acquisition on a data object corresponding to the descriptive information of the acquired target data object according to descriptive information of an acquisition configuration to obtain the acquisition result;
setting a first timer according to a reporting period, and setting a second timer according to reporting valid time;
in a case where the first timer is triggered, sending the acquisition result to the target node according to a reporting purpose ID; and
in a case where the second timer is triggered, clearing the first timer and the second timer, and then re-executing the step of querying the task ID of the data acquisition task corresponding to the reporting triggering event ID in the case where the event monitor monitors the triggering event corresponding to the reporting triggering event ID.

* * * * *